United States Patent
Fukuoka et al.

(10) Patent No.: US 7,756,215 B2
(45) Date of Patent: Jul. 13, 2010

(54) RADIO COMMUNICATION BASE STATION APPARATUS AND RADIO COMMUNICATION METHOD IN MULTI-CARRIER COMMUNICATIONS

(75) Inventors: Masaru Fukuoka, Ishikawa (JP); Hidetoshi Suzuki, Kanagawa (JP); Daichi Imamura, Kanagawa (JP); Akihiko Nishio, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 11/993,014

(22) PCT Filed: Jun. 22, 2006

(86) PCT No.: PCT/JP2006/312537

§ 371 (c)(1),
(2), (4) Date: Feb. 15, 2008

(87) PCT Pub. No.: WO2006/137495

PCT Pub. Date: Dec. 28, 2006

(65) Prior Publication Data

US 2009/0135924 A1    May 28, 2009

(30) Foreign Application Priority Data

Jun. 24, 2005   (JP) .............................. 2005-185014

(51) Int. Cl.
*H04L 27/00* (2006.01)
*H04L 27/20* (2006.01)
*H04J 11/00* (2006.01)
(52) U.S. Cl. ........................ 375/295; 375/308; 370/210

(58) Field of Classification Search ................. 375/295, 375/260, 377, 261, 298, 278, 280, 308; 455/450, 455/451, 452.1, 452.2, 453; 370/328, 310, 370/329, 330, 208, 210
See application file for complete search history.

(56) References Cited

U.S. PATENT DOCUMENTS

2006/0089102 A1   4/2006   Nishio (Continued)

FOREIGN PATENT DOCUMENTS

JP          2000-041019          2/2000

(Continued)

OTHER PUBLICATIONS

International Search report dated Sep. 12, 2006.

(Continued)

*Primary Examiner*—Tesfaldet Bocure
(74) *Attorney, Agent, or Firm*—Dickinson Wright PLLC

(57) ABSTRACT

Provided is a radio communication base station device capable of acquiring both a multi-user diversity effect and a frequency diversity effect simultaneously in multi-carrier communications. In this device, modulation units (101-1 to 101-*n*) modulate data to mobile stations (MS#1 to MS#n) individually to create data symbols. A separation unit (102) separates each data symbol inputted, into an Ich (in-phase components) and a Qch (orthogonal components). An Ich arrangement unit (103) and a Qch arrangement unit (104) arrange the Ich and Qch, respectively, in a plurality of sub-carriers constituting an OFDM symbols, and output the same to a synthesization unit (105). This synthesization unit (105) synthesizes the Ich and Qch arranged for each sub-carrier, to create the synthesized symbol.

9 Claims, 11 Drawing Sheets

U.S. PATENT DOCUMENTS

| | | | |
|---|---|---|---|
| 2006/0209669 A1* | 9/2006 | Nishio | 370/208 |
| 2007/0053449 A1 | 3/2007 | Adachi | |
| 2008/0192847 A1* | 8/2008 | Classon et al. | 375/260 |
| 2009/0135924 A1* | 5/2009 | Fukuoka et al. | 375/260 |

FOREIGN PATENT DOCUMENTS

| | | |
|---|---|---|
| JP | 2001-285250 | 10/2001 |
| JP | 2004-208234 | 7/2004 |
| JP | 2005-117581 | 4/2005 |
| WO | WO 2007/052766 | * 10/2007 |

OTHER PUBLICATIONS

R1-050604, "Downlink Channelization and Multiplexing for EUTRA," 3GPP TSG RAN WG1 Ad Hoc on LTE, Sophia Antipolis, France, Jun. 20-21, 2005, pp. 1-9, p. 3, lines 19-22.

* cited by examiner

| CONTROL INFORMATION | Ich | Qch |
|---|---|---|
| 00 | SUBBAND 1 | MAPPING PATTERN B |
| 01 | SUBBAND 2 | MAPPING PATTERN C |
| 10 | SUBBAND 3 | MAPPING PATTERN A |

RADIO COMMUNICATION BASE STATION APPARATUS AND RADIO COMMUNICATION METHOD IN MULTI-CARRIER COMMUNICATIONS

TECHNICAL FIELD

The present invention relates to a radio communication base station apparatus and a radio communication method in multicarrier communications.

BACKGROUND ART

In the field of radio communication, especially in mobile communication, a variety of information such as image and data in addition to voice is becoming transmission targets in recent years. It is anticipated that the demand for high-speed transmission becomes further increased in the future, and to perform high-speed transmission, a radio transmission technology, which utilizes limited frequency resources more effectively and achieves high transmission efficiency, has been required.

OFDM (Orthogonal Frequency Division Multiplexing) is one of radio transmission technologies, for meeting these requirements. OFDM is one of multicarrier communication technologies, whereby data is transmitted in parallel using a large number of subcarriers, and it is known that OFDM provides high frequency use efficiency and reducing inter-symbol interference under a multipath environment and is effective to improve transmission efficiency.

It is studied to perform frequency scheduling transmission and frequency diversity transmission using this OFDM on the downlink, when data for a plurality of radio communication mobile station apparatuses (hereinafter simply "mobile stations") are frequency multiplexed on a plurality of subcarriers (see Non-Patent Document 1 for instance).

In frequency scheduling transmission, a radio communication base station apparatus (hereinafter simply "base station") adaptively allocates subcarriers for mobile stations, based on received quality of each frequency band in each mobile station, so that it is possible to obtain a maximum multi-user diversity effect, thereby enabling extremely efficient communication. This frequency scheduling transmission scheme is mainly suitable for data transmissions when a mobile station moves at low speed. On the other hand, since frequency scheduling transmission requires feedback of received quality information from each mobile station, frequency scheduling transmission is not suitable for data transmissions when a mobile station moves at high speed. Moreover, frequency scheduling transmission is carried out based on received quality from each mobile station, and so it is difficult to apply frequency scheduling transmission to a common channel. Also, frequency scheduling is normally carried out for each subband, which groups a certain number of neighboring subcarriers into a block, and so not much frequency diversity effect is provided.

On the other hand, frequency diversity transmission maps data for the mobile stations in the subcarriers of the entire band in a distributed manner so that a high frequency diversity effect can be obtained. Moreover, frequency diversity transmission does not require feedback of received quality information from mobile stations, so that frequency diversity transmission is a useful scheme where frequency scheduling transmission is difficult to apply, as described above. On the other hand, the frequency diversity transmission is carried out regardless of received quality for each mobile station, and so multi-user diversity effect including the frequency scheduling transmission cannot be obtained.

Non-Patent Document 1: R1-050604 "Downlink Channelization and Multiplexing for EUTRA" 3GPP TSG RAN WG1 Ad Hoc on LTE, Sophia Antipolis, France, 20-21 Jun. 2005

DISCLOSURE OF INVENTION

Problems to be Solved by the Invention

Here, it is desirable that multi-user diversity effect and frequency diversity effect are obtained at the same time in multicarrier communications, so that received quality at the mobile stations can be further improved.

It is therefore an object of the present invention to provide a base station and a radio communication method that obtain the multi-user diversity effect and the frequency diversity effect at the same time in multicarrier communications.

Means for Solving the Problem

The base station of the present invention employs a configuration including: a radio communication base station apparatus that frequency multiplexes data for a plurality of radio communication mobile station apparatuses to a plurality of subcarriers forming an OFDM symbol; a separating section that separates data symbols into in-phase components and quadrature components; a mapping section that maps the in-phase components and the quadrature components to the plurality of subcarriers; a combining section that combines the mapped in-phase components and the mapped quadrature components to generate combined symbols; and a generating section that generates the OFDM symbol in which the combined symbols are allocated to the plurality of subcarriers, wherein the mapping section maps one of the in-phase components and the quadrature components to the plurality of subcarriers in a localized manner on a per radio communication mobile station apparatus basis, and maps the other one of the in-phase components and the quadrature components to the plurality of subcarriers in a distributed manner.

ADVANTAGEOUS EFFECTS OF THE INVENTION

According to the present invention, multi-user diversity effect and frequency diversity effect can be obtained at the same time.

BRIEF DESCRIPTION OF DRAWINGS

FIG. 9 is a table according to Embodiment 2 of the present invention;

BEST MODE FOR CARRYING OUT THE INVENTION

Embodiments of the present invention will be described below in detail with reference to the accompanying drawings.

Embodiment 1

Figure 1:
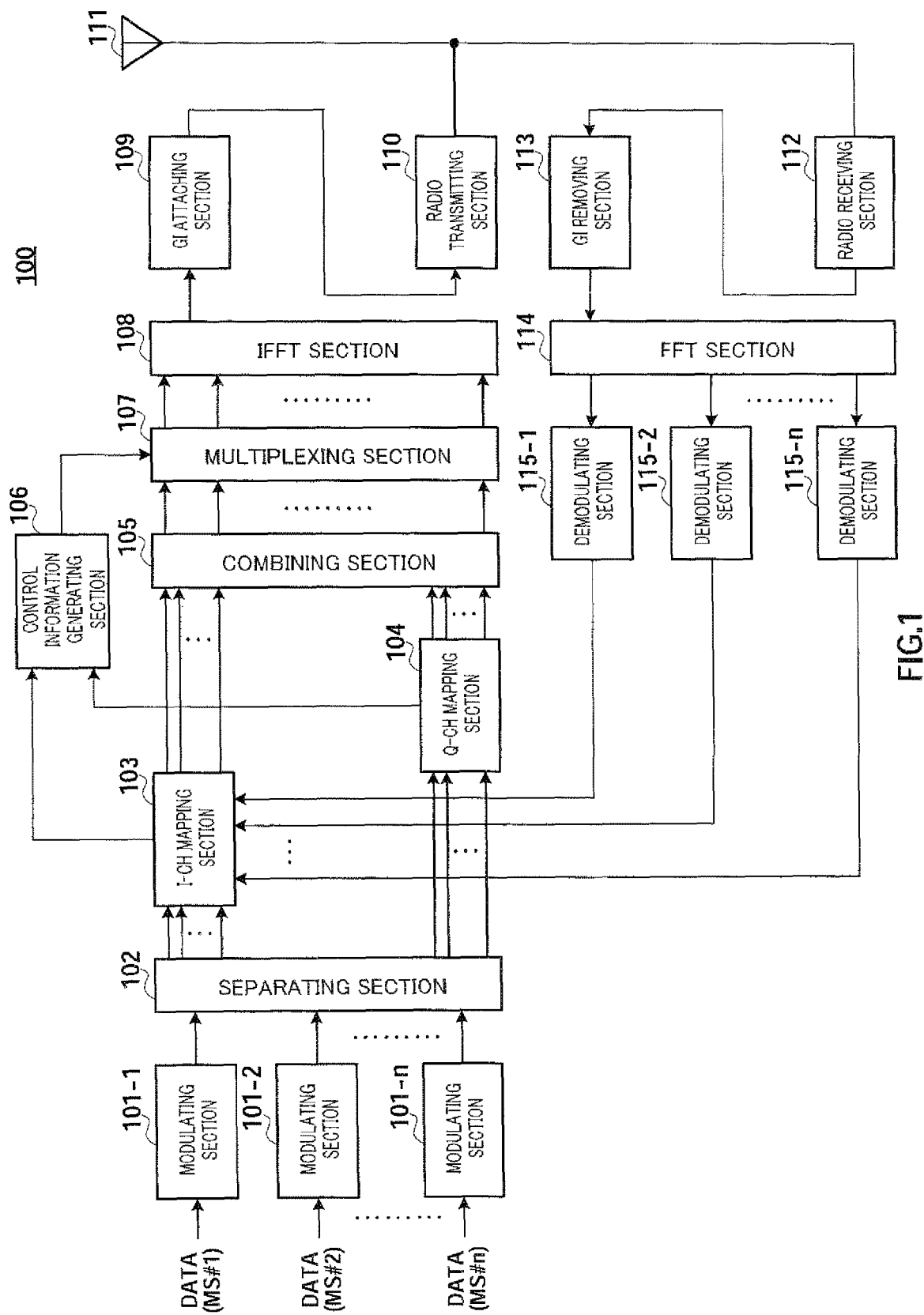
FIG. 1 is a block diagram showing a configuration of a base station, according to Embodiment 1 of the present invention.

FIG. 1 shows the configuration of base station 100 according to the present embodiment. Base station 100 shown in FIG. 1 frequency multiplexes data for a plurality of mobile stations MS#1 to MS#n, on a plurality of subcarriers forming an OFDM symbol, and transmits the result.

In base station 100, modulating sections 101-1 to 101-$n$ modulate data for a maximum of n mobile stations MS#1 to MS#n, to generate data symbols. The generated data symbols are inputted to separating section 102.

Separating section 102 separates inputted data symbols into the I-channels (in-phase components) and the Q-channels (quadrature components). The separated I-channels are inputted to I-ch mapping section 103. Moreover, the separated Q-channels are inputted to Q-ch mapping section 104.

I-ch mapping section 103 and Q-ch mapping section 104 map the I-channels and the Q-channels on a plurality of subcarriers forming an OFDM symbol, and output the result to combining section 105. I-ch mapping section 103 outputs I-ch mapping information (that is, which data symbol for which mobile station is mapped to which subcarrier) to control information generating section 106 and Q-ch mapping section 104 outputs Q-ch mapping information (that is, which data symbol for which mobile station is mapped to which subcarrier) to control information generating section 106.

Combining section 105 combines the I-channels and the Q-channels mapped to each subcarriers, to generate combined symbols. The generated combined symbols are inputted to multiplexing section 107.

The separation processing in separating section 102, the mapping processing in I-ch mapping section 103 and Q-ch mapping section 104, and the combining processing in combining section 105 will be described in detail later.

Control information generating section 106 generates control information formed with I-ch mapping information and Q-ch mapping information, and outputs the result to multiplexing section 107.

Multiplexing section 107 multiplexes the control information on the combined symbols inputted from combining section 105, and outputs the results to IFFT (Inverse Fast Fourier Transform) section 108. In this way, control information or combined symbols are allocated to the subcarriers. Incidentally, control information is multiplexed every TTI (Transmission Time Interval)=0.5 ms, for instance. Moreover, multiplexing of control information may be frequency multiplexing or time multiplexing.

IFFT section 108 performs IFFT processing on a plurality of subcarriers to which the control information or combined symbols are allocated, to thus generate an OFDM symbol, which is a multicarrier signal. This OFDM symbol is inputted to GI attaching section 109.

GI attaching section 109 attaches the same signal as the tail part of an OFDM symbol, to the beginning of that OFDM symbol to provide a guard interval ("GI").

Radio transmitting section 110 performs transmission processing such as D/A conversion, amplification and up-conversion, on the OFDM symbol with an attachment of a GI, and transmits the result from antenna 111 to each mobile station.

Meanwhile, radio receiving section 112 receives n OFDM symbols via antenna 111, transmitted at the same time from a maximum of n mobile stations MS#1 to MS#n, and performs receiving processing such as down conversion and D/A conversion on these OFDM symbols. The OFDM symbols after receiving processing are inputted to GI removing section 113.

GI removing section 113 removes the GI from the OFDM symbol after receiving processing, and outputs the result to FFT (Fast Fourier Transform) section 114.

FFT section 114 performs FFT processing on the OFDM symbol after the GI removal to obtain mobile station-specific signals multiplexed in the frequency domain. The mobile station-specific signals after FFT are inputted to demodulating sections 115-1 to 115-$n$.

Here, the mobile stations transmit signals using unique subcarriers or unique subbands, and the mobile station-specific signals include received quality information for each subband reported from each mobile station. Besides, each mobile station is able to measure received quality of each subband, from, for instance, the received SNR, received SIR, received SINR, received CINR, received power, interference power, bit error rate, throughput, MCS that achieves a predetermined error rate, and so on. In addition, received quality information may be referred to as "CQI" (Channel Quality Indicator) or "CSI" (Channel State Information), for instance.

Incidentally, a plurality of subcarriers forming an OFDM symbol are divided into a number of bocks referred to as "subbands", and each subband includes a plurality of subcarriers. For instance, if an OFDM symbol formed with subcarriers $f_1$ to $f_{15}$ is divided into three subbands 1 to 3, subbands 1 to 3 each include five subcarriers. Moreover, a "subband" may also be referred to as a "sub-channel", a "subcarrier block", a "chunk" or a "resource block".

Demodulating sections 115-1 to 115-$n$, which are provided so as to correspond to mobile stations MS#1 to MS#n, perform demodulation processing on the signals after FFT, and output received quality information per subband obtained through the demodulation processing, to I-ch mapping section 103.

Based on received quality information per subband reported from each mobile station, I-ch mapping section 103 maps the I-ch by frequency scheduling. Specifically, based on received quality information of each subband, I-ch mapping section 103 performs frequency scheduling that determines to which subband the I-channel of each data symbol is mapped to which subcarrier, using scheduling algorithms such as Max SIR method and the proportional fairness method.

Figure 2A:
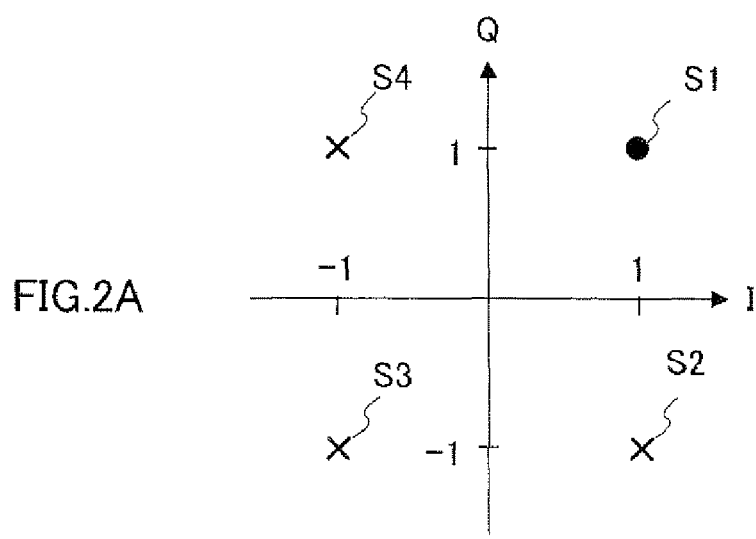
FIG. 2A illustrates separation processing according to Embodiment 1 of the present invention (prior to separation)

Next, the separation processing in separating section 102 will be described using FIG. 2A to FIG. 2C. Here, assume that modulating sections 101-1 to 101-*n* perform modulation using the QPSK scheme. That is, symbol point constellations S1 to S4 of the data symbols are shown in FIG. 2A.

Figure 2B:
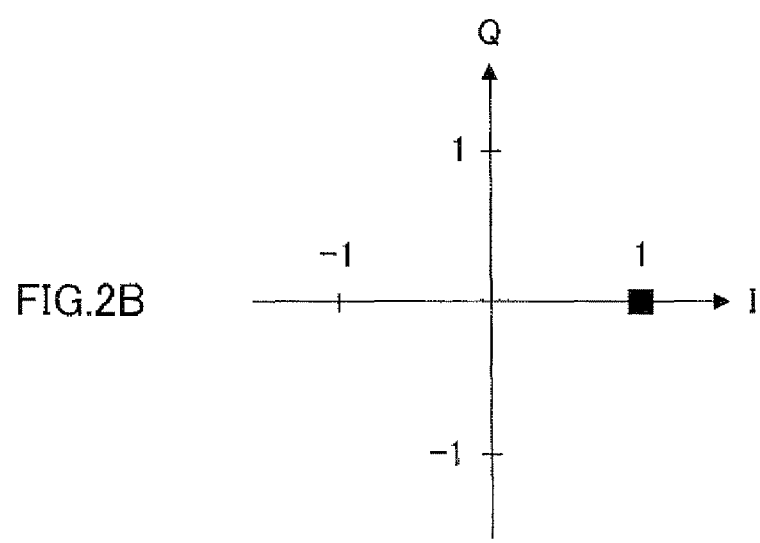
FIG. 2B illustrates the separation processing according to Embodiment 1 of the present invention (after separation: I-ch)
Figure 2C:
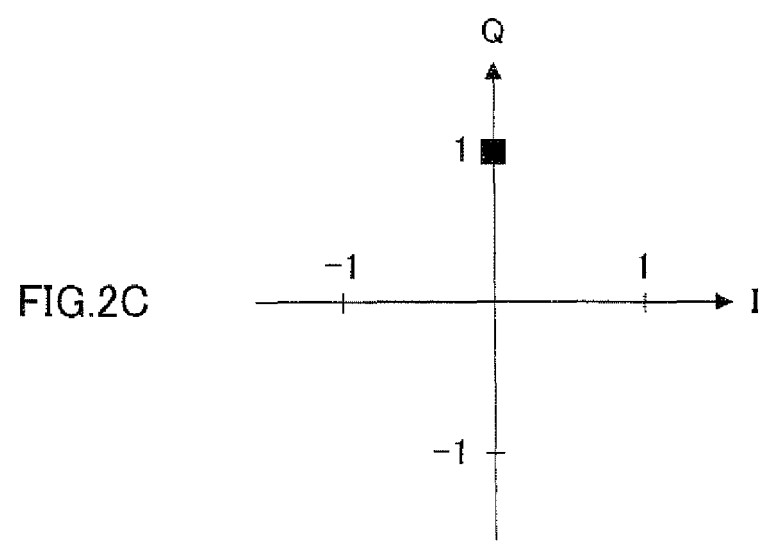
FIG. 2C illustrates the separation operation according to Embodiment 1 of the present invention (after separation: Q-ch)

When data symbol S1 of (I,Q)=(1,1) is separated into the I-channel and the Q-channel, for instance, the separated I-channel is as shown in FIG. 2B, and the separated Q-channel is as shown in FIG. 2C. Specifically, data symbol S1 of (I,Q)=(1,1) is separated into I-channel=1 and Q-channel=1. The other data symbols S2 to S4 can be separated in a similar manner. In this way, the separated I-channels and Q-channels are inputted to I-ch mapping section 103 and Q-ch mapping section 104, respectively.

Figure 3:
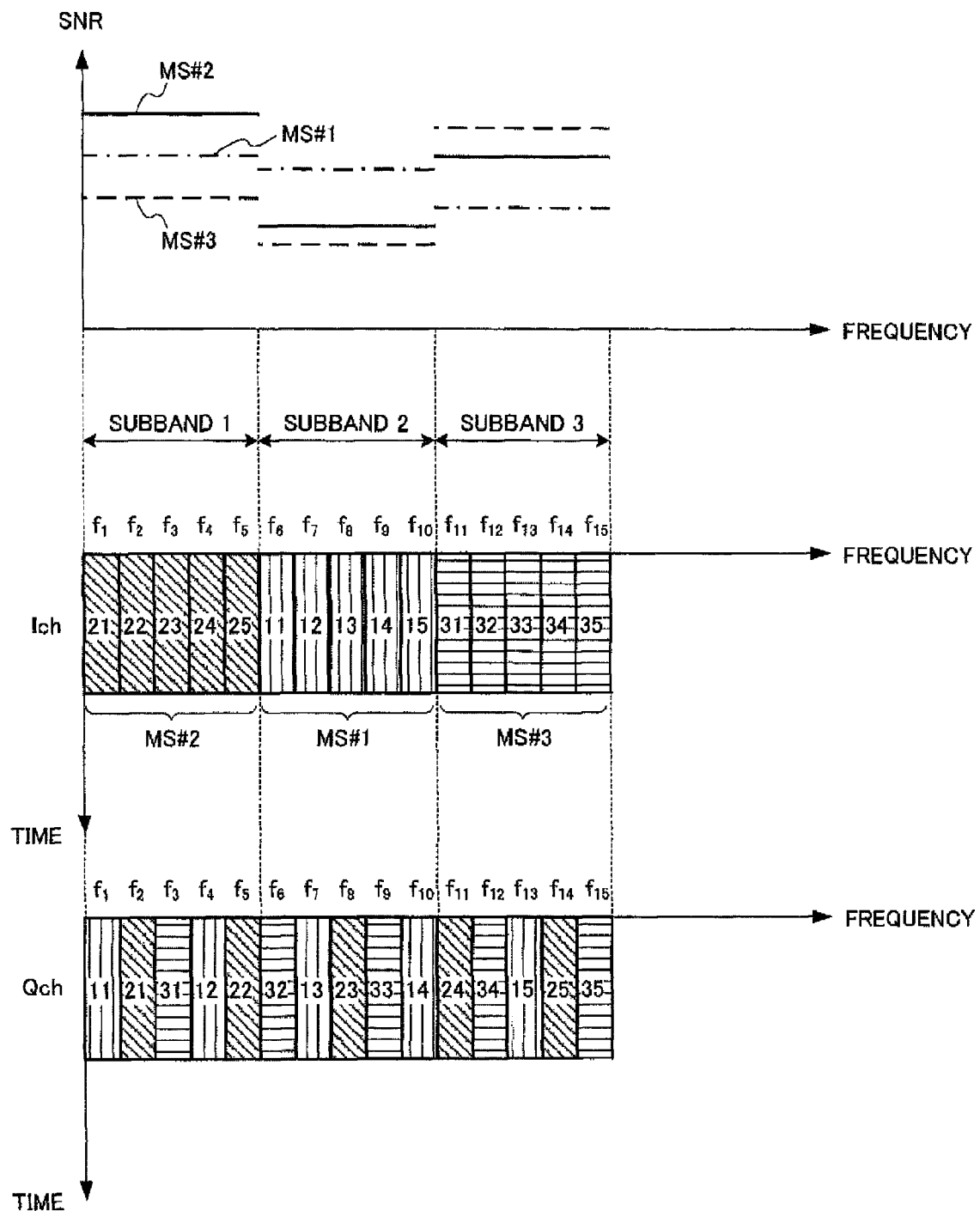
FIG. 3 illustrates mapping processing according to Embodiment 1 of the present invention (for I-ch and Q-ch)

Next, the mapping processing in I-ch mapping section 103 and Q-ch mapping section 104 will be described using FIG. 3. Here, for ease of explanation, assume that the OFDM symbol is formed with subcarriers $f_1$ to $f_{15}$, and subcarriers $f_1$ to $f_{15}$ are divided three subbands one to three, as shown in FIG. 3. Moreover, assume that five data symbols for each of the three mobile stations MS#1 to MS#3 (a total of fifteen data symbols) are frequency multiplexed and transmitted at the same time. Moreover, assume that each mobile station measures received quality of each subband from received SNR.

First, the mapping processing at I-ch mapping section 103 will be described. If in subbands one to three the SNR for mobile stations MS#1 to MS#3 becomes as shown in FIG. 3, the SNR for mobile station MS#2 is the highest in subband 1, the SNR for mobile station MS#1 is the highest in subband 2, and, the SNR for mobile station MS#3 is the highest in subband 3. That is, by frequency scheduling, I-ch mapping section 103 maps the I-channels of data symbols 21 to 25 for mobile station MS#2 to subband 1 (subcarriers $f_1$ to $f_5$), maps the I-channels of data symbols 11 to 15 for mobile station MS#1 to subband 2 (subcarriers $f_6$ to $f_{10}$), and maps the I-channels of data symbols 31 to 35 for mobile station MS#3 to subband 3 (subcarrier $f_{11}$ to $f_{15}$).

In this way, I-ch mapping section 103 maps the I-channels of each data symbol on a per mobile station basis, to a plurality of subbands in the frequency domain. In other words, I-ch mapping section 103 maps the I-channels of a plurality of data symbols (for instance, data symbols 11 to 15) for one of a plurality of mobile stations (for instance, MS#1) to one of a plurality of subbands (for instance, subband 2), in a localized manner. By this means, frequency scheduling transmission is performed with the I-channel of each data symbol. incidentally, I-ch mapping section 103 performs this frequency scheduling every TTI=0.5 ms, for instance. The I-channel and Q-channel components of MS#1's symbols are represented in FIG. 3 by vertical hashing, such components of MS#2's symbols are represented by slanted hashing, and such components of MS#3's symbols are represented by horizontal hashing.

On the other hand, Q-ch mapping section 104 maps the Q-channels of each data symbol to a plurality of subcarriers on a per mobile station basis in a distributed manner, regardless of the SNR for mobile stations MS#1 to MS#3 in each subband. Specifically, as shown in FIG. 3, Q-ch mapping section 104 maps the Q-channels of data symbols 11 to 15 for mobile station MS#1 to subcarriers $f_1$, $f_4$, $f_7$, $f_{10}$ and $f_{13}$, maps the Q-channels of data symbols 21 to 25 for mobile station MS#2 to subcarriers $f_2$, $f_5$, $f_8$, $f_{11}$ and $f_{14}$, and maps the Q-channels of data symbols 31 to 35 for mobile station MS#3 to subcarriers $f_3$, $f_6$, $f_9$, $f_{12}$ and $f_{15}$. By this means, frequency diversity transmission is performed with the Q-channel of each data symbol.

In this way, in the present embodiment, by separating data symbols into the I-channels and the Q-channels, the same data is subjected to both frequency scheduling transmission and frequency diversity transmission.

Figure 4A:
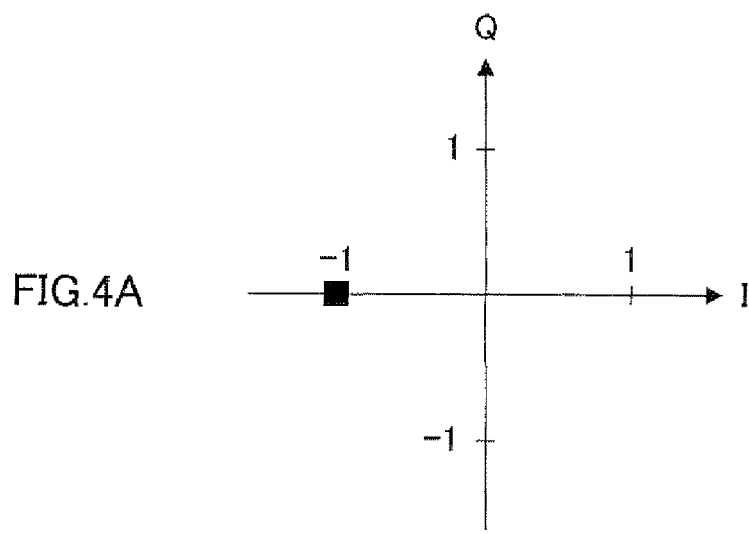
FIG. 4A illustrates combining processing according to Embodiment 1 of the present invention (prior to combining: I-ch)
Figure 4B:
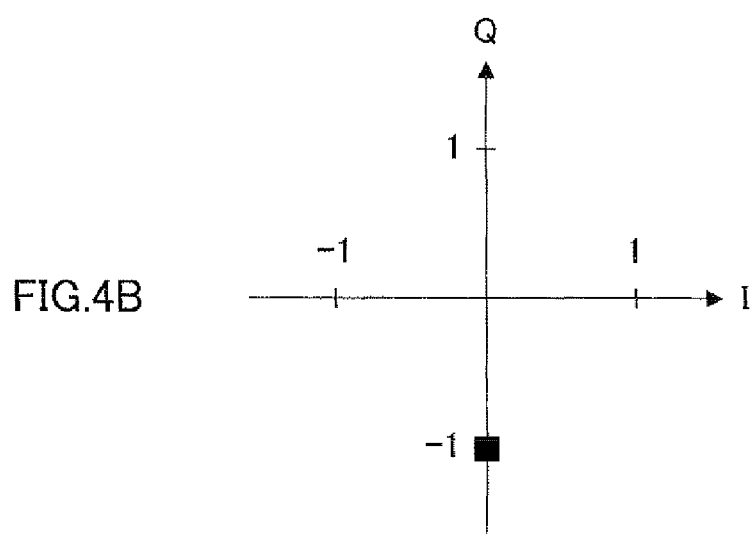
FIG. 4B illustrates the combining processing according to Embodiment 1 of the present invention (prior to combining: Q-ch)
Figure 4C:
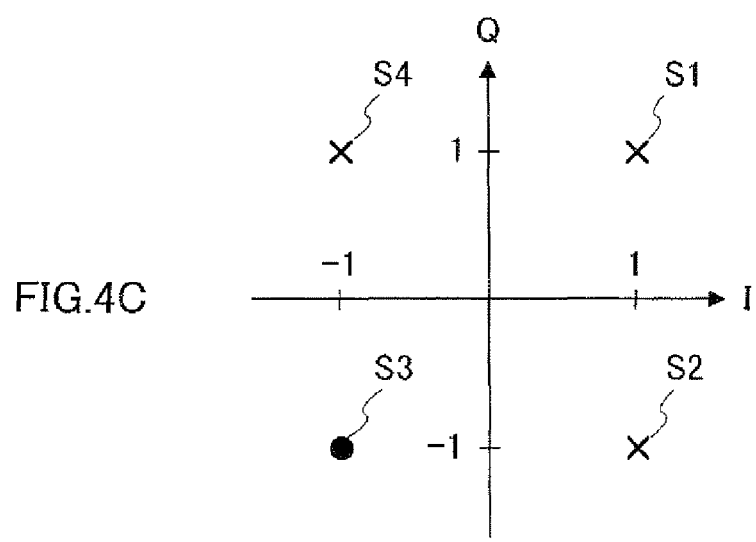
FIG. 4C illustrates the combining processing according to Embodiment 1 of the present invention (after combining)

Next, the combining processing in combining section 105 will be described using FIG. 4A to FIG. 4C. Focusing on subcarrier $f_{14}$ shown in FIG. 3, with respect to the I-channels, the I-channel of data symbol 34 for mobile station MS#3 is mapped to subcarrier $f_{14}$, and with respect to the Q-channels, the Q-channel of data symbol 25 for mobile station MS#2 is mapped to subcarrier $f_{14}$. Specifically, the I-channel and the Q-channel for a plurality of different mobile stations are mapped to one subcarrier at the same time. Then, if the I-channel and the Q-channel mapped to subcarrier $f_{14}$ are I-channel=−1 (FIG. 4A) and Q-channel=−1 (FIG. 4B), for instance, combining section 105 combines the I-channel and the Q-channel as shown in FIG. 4C to generate combined symbol S3. Similarly, combining section 105 generates one of combined symbols S1 to S4, with respect to the other subcarriers. As described above, frequency scheduling transmission is applied to the I-channel and frequency diversity transmission is applied to the Q-channel, so that, by this combining, frequency scheduling transmission and frequency diversity transmission are performed for combined symbols at the same time.

Although a case has been described with the above description where the I-channels are mapped to a plurality of subcarriers in a localized manner on a per mobile station basis and the Q-channels are mapped to a plurality of subcarriers in a distributed manner, the Q-channels may be mapped in a localized manner on a per mobile station basis and the I-channels may be mapped in a distributed manner. That is, with the present invention, either the I-channels or the Q-channels are mapped in a localized manner on a per mobile station basis, and the other channels are mapped in a distributed manner on a per mobile station basis, in the frequency domain.

By this means, according to the present embodiment, each data symbol is separated into the I-channel and the Q-channel, and frequency scheduling transmission is performed for one channel, and frequency diversity transmission is performed for the other channel. By this means, multi-user diversity effect and frequency diversity effect can be obtained for the same data at the same time, so that received quality at the mobile stations can be further improved.

Moreover, referring to the conditions of the SNR shown in FIG. 3 above, focusing on mobile station MS#1, among the SNRs for mobile station MS#1 in subbands 1 to 3, the SNR for subband 1 is the highest. However, the SNR for mobile station MS#2 for subband 1 is even higher, so that the I-channels for mobile station MS#1 are not mapped to subband 1, but are mapped to subband 2. As a result, mobile station #1 cannot obtain a maximal diversity effect. In this way, even in the case where the I-channel cannot obtain a maximal multi-user diversity effect, according to the present embodiment, the frequency diversity of the Q-channel can complement the diversity effect.

Moreover, in the present embodiment, each data symbol is separated into the I-channel and the Q-channel, and the I-channel and the Q-channel are individually mapped to subcarriers. That is, for instance, when the pilot is transmitted at the Q-channel to improve Q-channel estimation accuracy, the pilot can be allocated to the Q-channel, without influencing I-channel mapping.

Incidentally, in the present embodiment, a plurality of I-channels for one mobile station are mapped to one subband only. However, if the amount of data increases, a plurality of I-channels for one mobile station may be mapped over a plurality of subbands. Still, even in this case, a plurality of subcarriers to which a plurality of I-channels for one mobile station are mapped are neighboring subcarriers.

Figure 5:
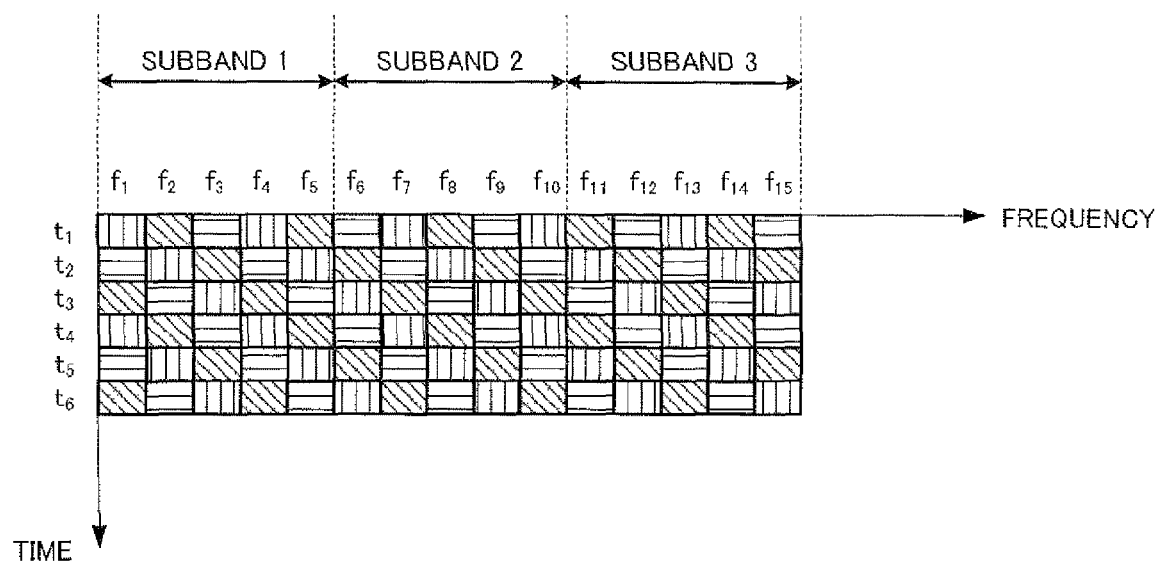
FIG. 5 illustrates mapping processing (for Q-ch) according to Embodiment 1 of the present invention.

Moreover, as shown in FIG. 5, the Q-ch distributed mapping may be changed over time, specifically, on a per OFDM symbol basis. In the example shown in FIG. 5, the mapping pattern is shifted toward the right direction on a per subcarrier basis. This further improves frequency diversity effect.

Embodiment 2

According to the present embodiment, the base station serves to determine Q-ch mapping patterns in accordance with I-ch mapping patterns, and serves to map Q-channels in a distributed manner on a per mobile station basis to subcarriers in subbands to which I-channels are not mapped. Specifically, the base station according to the present embodiment differs from Embodiment 1 in that the Q-channels of a plurality of data symbols for one of a plurality of mobile stations are mapped in a distributed manner to subcarriers, other than the subcarriers included in a subband to which the I-channels are mapped.

Figure 6:
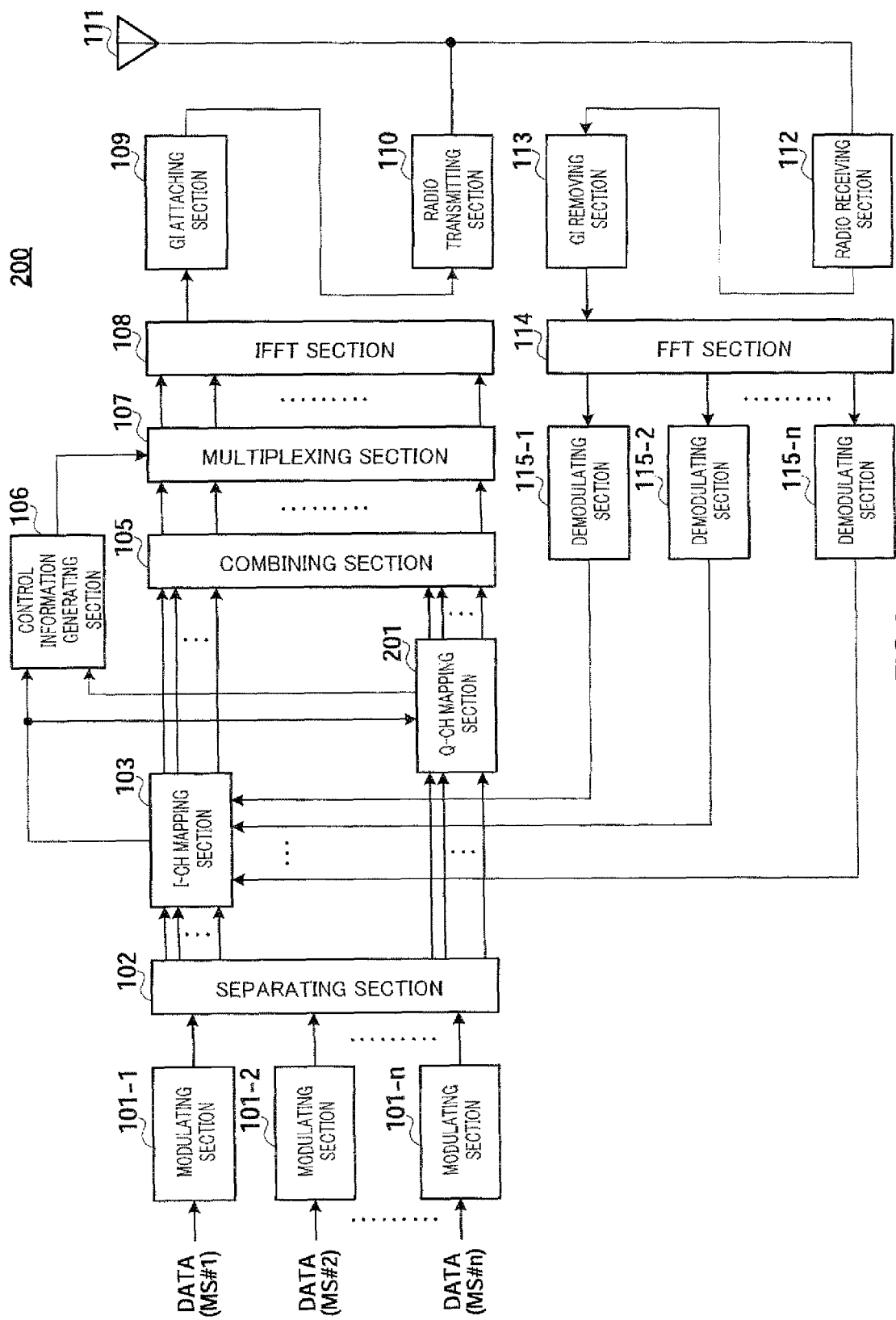
FIG. 6 is a block diagram showing a configuration of a base station, according to Embodiment 2 of the present invention.

FIG. 6 shows the configuration of base station 200 according to the present embodiment. In FIG. 6, the same parts are assigned to the same reference numerals as in Embodiment 1 (FIG. 1) and description thereof will be omitted.

In base station 200, the I-ch mapping information outputted from I-ch mapping section 103 is also inputted to Q-ch mapping section 201.

Figure 7:
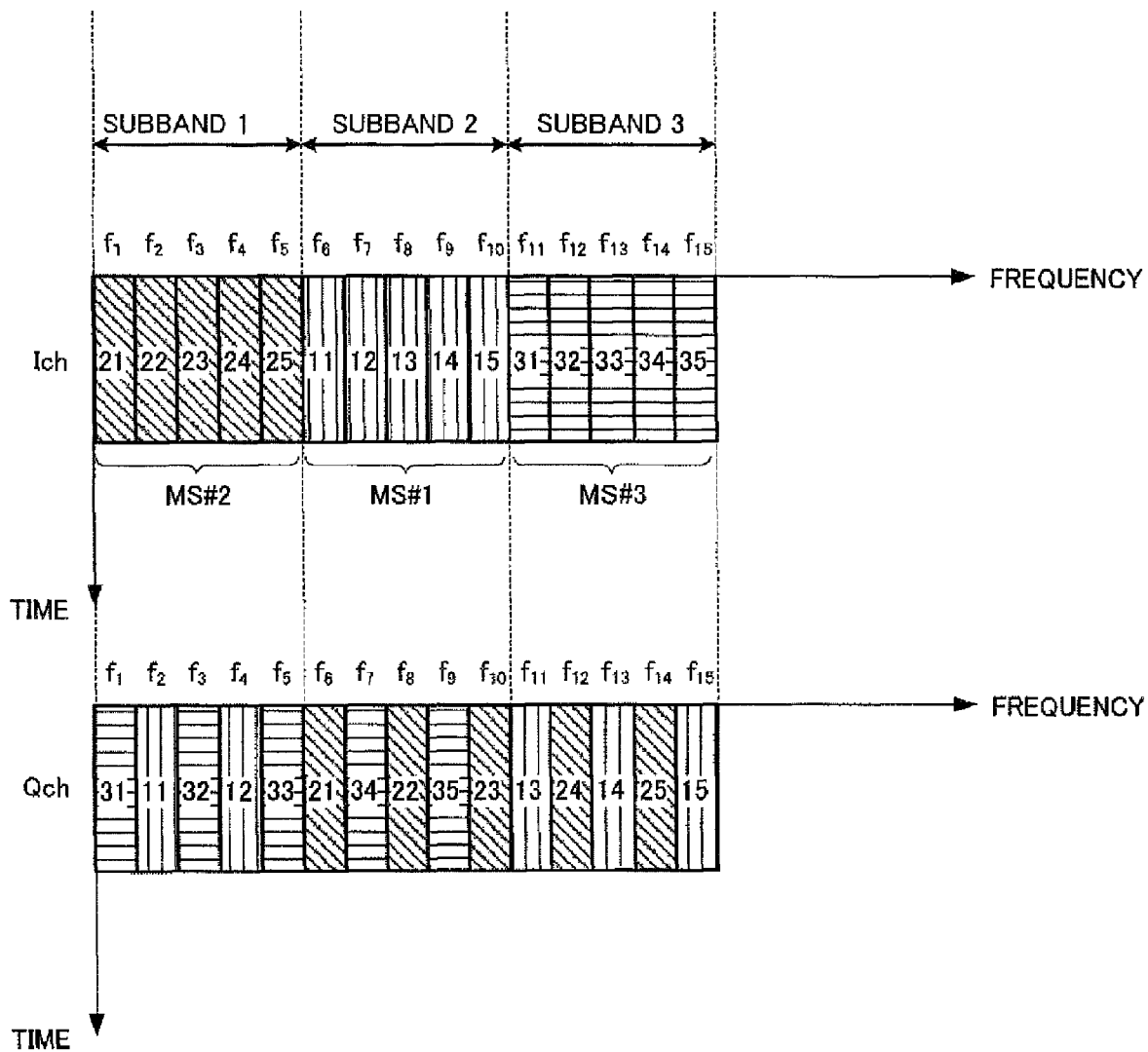
FIG. 7 illustrates mapping processing (for I-ch and Q-ch) according to Embodiment 2 of the present invention.

Based on the I-ch mapping information, Q-ch mapping section 201 maps the Q-channels for each mobile station to a plurality of subcarriers in a distributed manner on a per mobile station basis. To be more specific, the Q-channels are mapped as shown in FIG. 7. Specifically, focusing on mobile station MS#2, the I-channels are mapped to subband 1 by I-ch mapping section 103, as in Embodiment 1 (FIG. 3). On the other hand, the Q-channels are mapped in a distributed manner to subbands 2 and 3 other than subband 1, by Q-ch mapping section 201. To be more specific, the Q-ch are mapped in a distributed manner to subcarriers $f_6$, $f_8$, $f_{10}$, $f_{12}$ and $f_{14}$, other than subcarriers $f_1$ to $f_5$ included in subband 1. The same applies to Q-channels for mobile stations MS#1 and #3.

By this means, the frequency diversity effect can be further improved by mapping the Q-channels to subcarriers to which the I-channels are not mapped.

Figure 8:
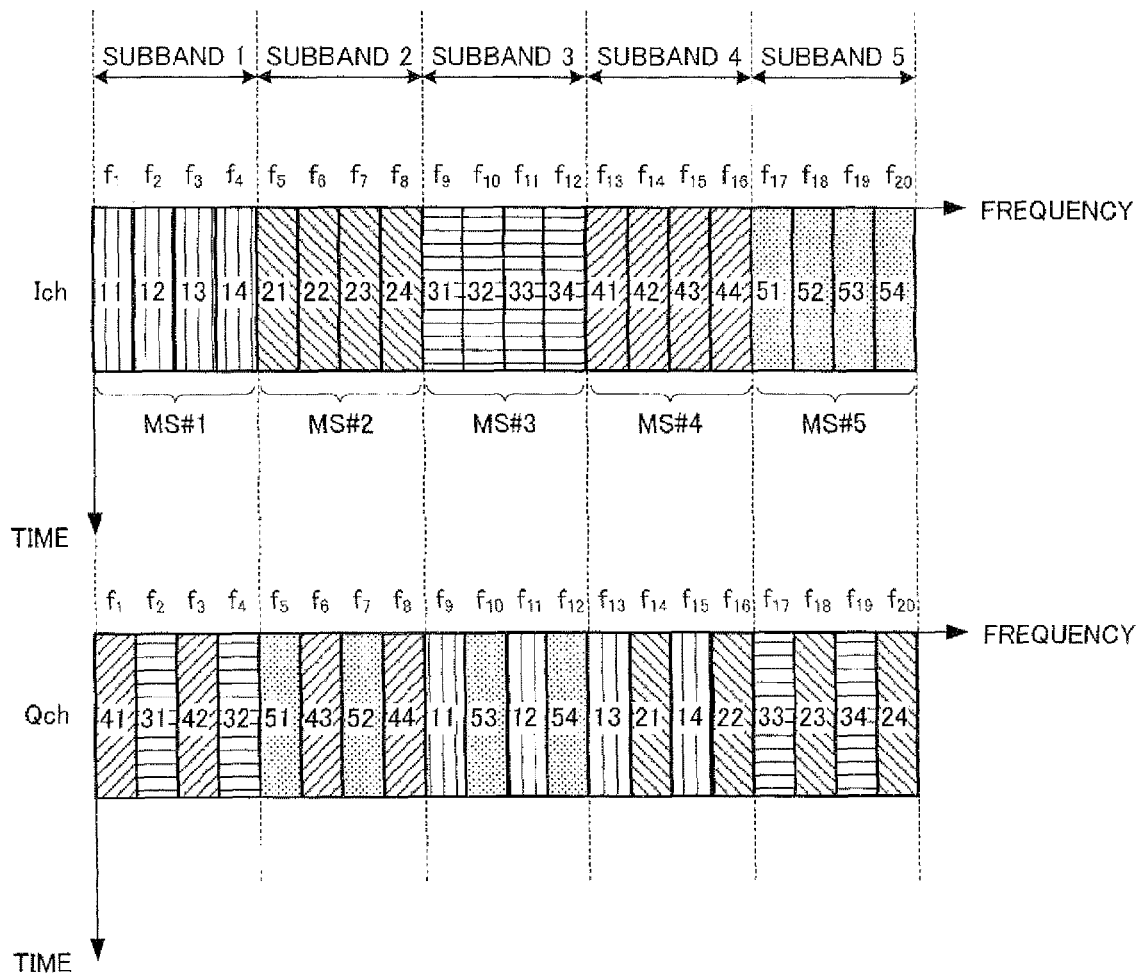
FIG. 8 the mapping processing (for I-ch and Q-ch) according to Embodiment 2 of the present invention.

Moreover, by mapping the Q-channels as shown in FIG. 8, the frequency diversity effect can further be improved compared to the mapping shown in FIG. 7. Focusing on mobile station MS#3 as shown in FIG. 8, the I-channels are mapped to subband 3, while the Q-channels are mapped to subbands 1 and 5. In other words, the Q-channels are mapped to subcarriers included in subbands other than subbands 2, 3 and 4. The same applies to the Q-channels for mobile stations MS#1, #2, #4 and #5. Specifically, Q-ch mapping section 201 maps the Q-channels for the mobile stations in a distributed manner to subbands other than the subbands to which the I-channels are mapped and the neighboring subbands.

Incidentally, Q-ch mapping section 201 has a table of the relationships between the I-ch mapping pattern and the Q-ch mapping pattern, so that the Q-ch mapping pattern can be uniquely determined from the I-ch mapping pattern. For instance, Q-ch mapping section 201 has the table shown in FIG. 9 (a table of the relationships between a plurality of subbands and a plurality of mapping patterns), determines the Q-ch mapping pattern in a distributed manner on a per mobile station basis in accordance with the subbands to which the I-channels are mapped, and maps the Q-channels in a distributed manner in accordance with the determined mapping patterns. For instance, for the mobile stations to which the I-channels are mapped to subband 1 by I-ch mapping section 103, Q-ch mapping section 201 maps the Q-channels in a distributed manner in accordance with mapping pattern B.

By having this table in control information generating section 106, it is possible to generate control information ("00" to "10" in FIG. 9), that designates the combinations between I-ch mapping pattern and Q-ch mapping pattern, as mapping information. By this means, the amount of control information can be reduced. Also, base station 200 no longer needs to transmit I-ch mapping information and Q-ch mapping information respectively, for each mobile station, so that the amount of signaling for each mobile station can be reduced.

Embodiment 3

As described above, frequency scheduling transmission is performed based on received quality at each mobile station, and so it is difficult to apply frequency scheduling transmission to common channels.

Then, similar to Embodiment 1, the base station according to the present embodiment maps the I-channels in a localized manner on a per mobile station basis and maps the Q-channels in a distributed manner to dedicated channel data symbols, while the base station maps both the I-channels and the Q-channels to common channel data symbols in a distributed manner.

Figure 10:
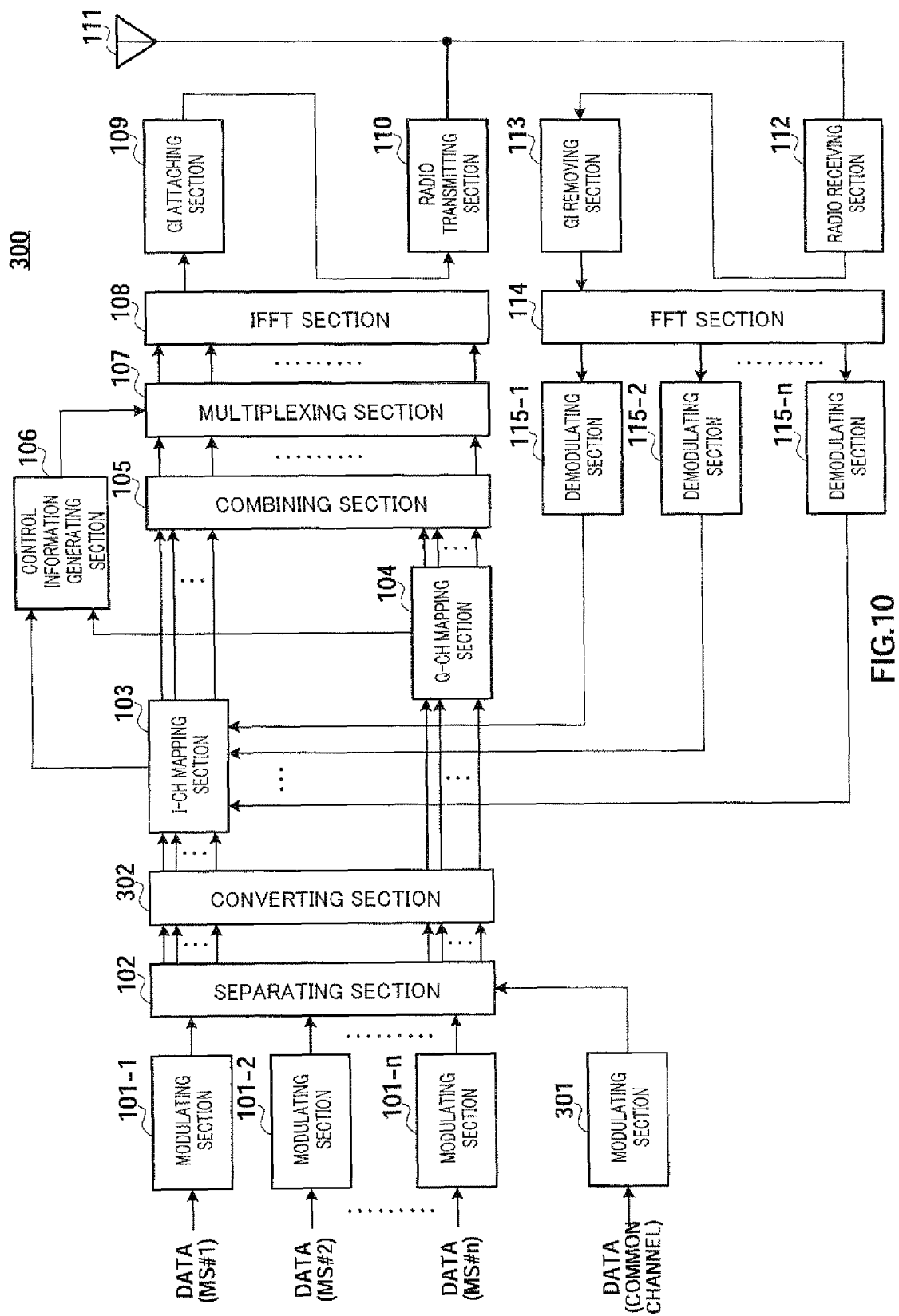
FIG. 10 is a block diagram showing a configuration of a base station according to Embodiment 3 of the present invention.

FIG. 10 shows the configuration of base station 300 according to the present embodiment. In FIG. 10, the same parts are assigned to the same reference numerals as in Embodiment 1 (FIG. 1) and description thereof will be omitted.

In base station 300, data inputted to modulating sections 101-1 to 101-$n$ is dedicated channel data. Incidentally, according to 3GPP standards, the dedicated channels include DCH (Dedicated Channel), DCCH (Dedicated Control Channel), DPCH (Dedicated Physical Channel), DPDCH (Dedicated Physical Data Channel), and DPCCH (Dedicated Physical Control Channel).

Modulating section 301 modulates the common channel data to generate data symbols. The generated data symbols are inputted to separating section 102. Incidentally, according to 3GPP standards, common channels include BCH (Broadcast Channel), P-CCPCH (Primary Common Control Physical Channel), and S-CCPCH (Secondary Common Control Physical Channel).

Separating section 102 separates an inputted data symbol into the I-channel and the Q-channel. The separated I-channel and Q-channel are inputted to converting section 302.

Among the I-channels and the Q-channels of inputted data symbols, conversion section 302 selects the I-channels of the common channel data symbols, converts the I-channels into Q-channels, and outputs the result to Q-ch mapping section 104. Moreover, converting section 302 directly outputs other I-channels and Q-channels to I-ch mapping section 103 or Q-ch mapping section 104.

Figure 11:
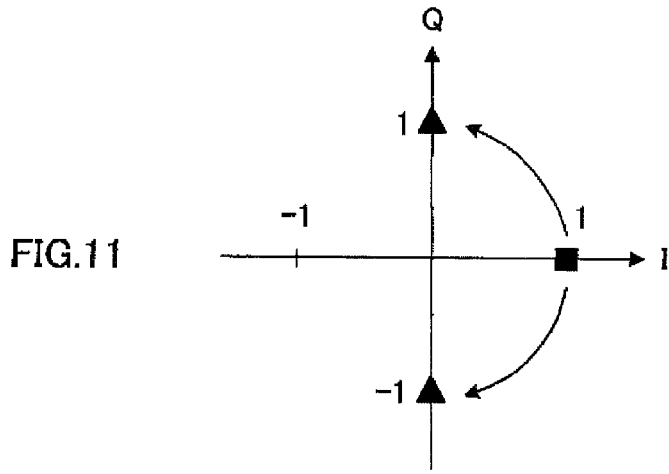
FIG. 11 illustrates conversion processing according to Embodiment 3 of the present invention.
Figure 12:
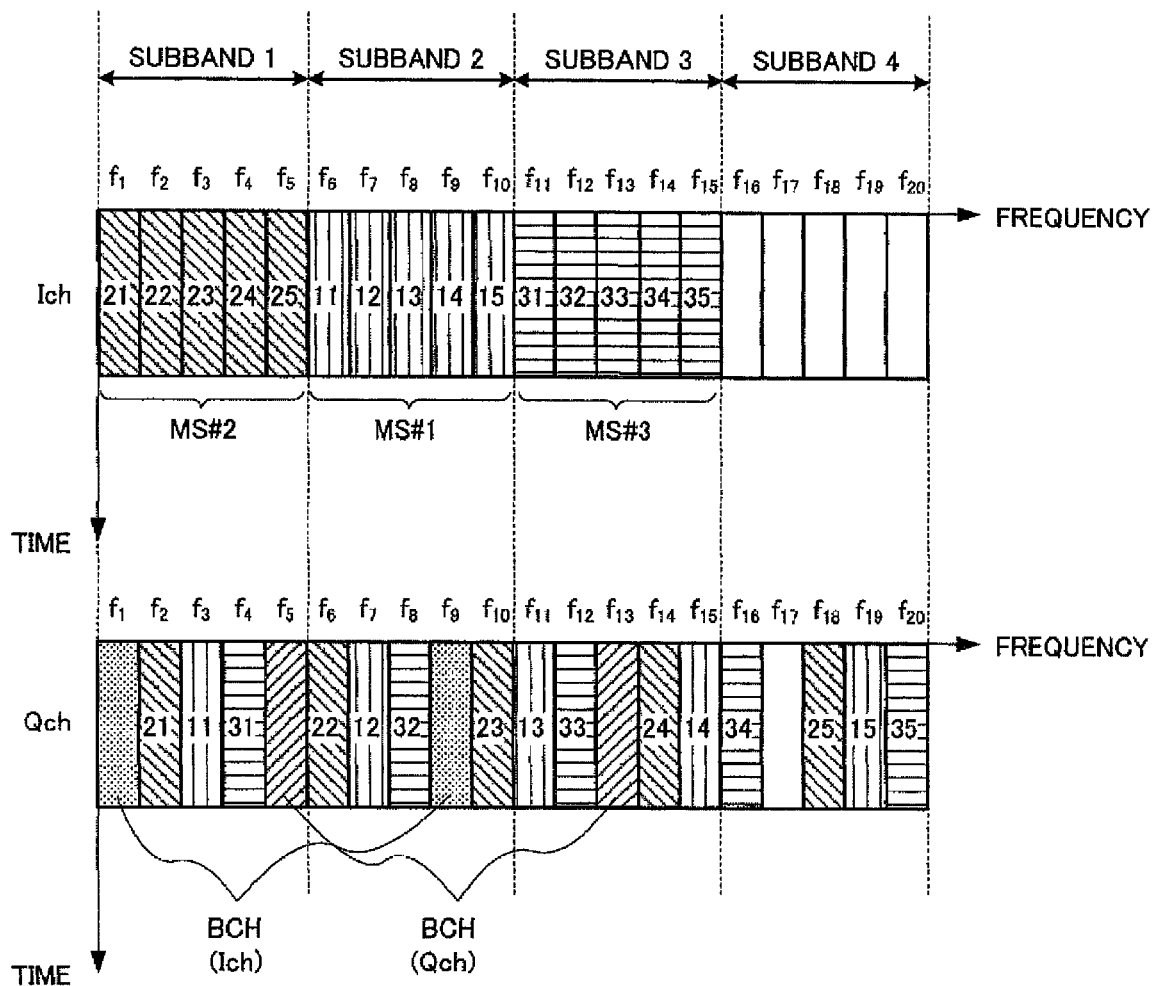
FIG. 12 illustrates mapping processing (for I-ch and Q-ch) according to Embodiment 3 of the present invention.

FIG. 11 shows the conversion processing in converting section 302. If the I-channel of the common channel data symbol is one, for instance, converting section 302 applies a 90 degrees or −90 degrees phase rotation to I-ch=1 to convert it into the Q-channel=1 or −1, and outputs the converted Q-channel to Q-ch mapping section 104. This conversion makes it possible to handle the I-channel of the common channel data symbols, as the Q-channel. Specifically, as shown in FIG. 12, the I-channels of the common channel data symbols (BCH in FIG. 12) can be mapped to a plurality of subcarriers in a distributed manner as well as the Q-channels. Consequently, according to the present embodiment, frequency diversity effect of the common channel can be improved.

Incidentally, besides the common channel data, for data for which is difficult to perform frequency scheduling transmission including, high-speed data and data for mobile stations moving at high speed, the I-channel and the Q-channel may both be mapped in a distributed manner as described above. In addition, with respect to information which is not subjected to error correcting coding (for instance, ACK information/NACK information for retransmission control), mapping the I-channels and the Q-channels in a distributed manner as described above is also effective for improving diversity effect.

Embodiments of the present invention have been described.

Although a case has been described with the above-described embodiments where signals received at the base station (specifically, signals transmitted by the mobile station on the uplink) are transmitted using the OFDM schemer these signals may also be transmitted using, for instance, the DFT-SOFDM (Discrete Fourier Transform-Spread OFDM) scheme and R-OFDM (Rotational code-multiplexed OFDM) scheme. Also, these signals may be transmitted using transmission schemes including single-carrier scheme and CDMA scheme, other than OFDM scheme.

Moreover, the mobile station may be referred to as "UE", the base station apparatus may be referred to as "Node-B", and the subcarrier may be referred to as a "tone".

Moreover, a channel for performing frequency scheduling transmission (channel for transmitting the I-channel in the above-described embodiments) may be referred to as "localized channel", a channel for performing frequency diversity transmission (channel for transmitting the Q-channel of the above-described embodiments) may be referred to as "distributed channel". Moreover, the localized channel is generally allocated in subband units, or in units of a plurality of consecutive subcarriers. Moreover, the distributed channel is generally configured across the entire band of an OFDM symbol, by a plurality of equally spaced subcarriers, and is defined by an FH (Frequency Hopping) pattern. Furthermore, the distributed channel may be the object of frequency interleaving. Incidentally, the localized channel may be referred to as "localized resource block" (LRB), and the distributed channel may be referred to as "distributed resource block" (DRB).

Moreover, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-185014, filed on Jun. 24, 2005, the entire content of which is expressly incorporated by reference herein.

INDUSTRIAL APPLICABILITY

The present invention is applicable to, for instance, mobile communication systems.

The invention claimed is:

1. A radio communication apparatus comprising:
   a separating section that separates data symbols into in phase components and quadrature components; and
   a mapping section that maps the in phase components and the quadrature components to a plurality of subcarriers,
   wherein the mapping section maps one of the in phase components and the quadrature components to the plurality of subcarriers in a localized manner, and maps the other one of the in phase components and the quadrature components to the plurality of subcarriers in a distributed manner.

2. The radio communication apparatus according to claim 1, further comprising a combining section that combines the in phase components and the quadrature components after the mapping by the mapping section, to generates combined symbols.

3. The radio communication apparatus according to claim 1, wherein:
   the plurality of subcarriers are grouped into a plurality of subbands; and
   the mapping section maps one of the in phase components and the quadrature components of a plurality of data symbols for one communicating party, to one of the plurality of subbands in the localized manner.

4. The radio communication apparatus according to claim 1, wherein:
   the plurality of subcarriers are grouped into a plurality of subbands; and
   the mapping section maps one of the in phase components and the quadrature components to the plurality of subbands in the localized manner on a per communicating party basis.

5. The radio communication apparatus according to claim 1, wherein the mapping section maps one of the in phase components and the quadrature components in the localized manner on a per communicating party basis by frequency scheduling.

6. The radio communication apparatus according to claim 5, wherein the mapping section performs the frequency scheduling every transmission time interval.

7. The radio communication apparatus according to claim 1, wherein:
   the plurality of subcarriers are grouped into a plurality of subbands; and
   the mapping section maps one of the in phase components and the quadrature components of a plurality of data symbols for one communicating party, to one of the plurality of subbands in the localized manner, and maps the other one of the in phase components and the quadrature components of the plurality of data symbols for one communicating party, to subcarriers other than subcarriers included in the one of the plurality of subbands in the distributed manner.

8. The radio communication apparatus according to claim 1, wherein:

the mapping section maps one of the in phase components and the quadrature components of dedicated channel data symbols to the plurality of subcarriers in the localized manner on a per communicating party basis, and the other one of the in phase components and the quadrature components of the dedicated channel data symbols to the plurality of subcarriers in the distributed manner, and maps both of the in phase components and the quadrature components of common channel data symbols to the plurality of subcarriers in the distributed manner.

9. A radio communication method comprising the steps of:

separating data symbols into in phase components and quadrature components; and mapping the in phase components and the quadrature components to a plurality of subcarriers, wherein, in the mapping step, mapping one of the in phase components and the quadrature components to the plurality of subcarriers in a localized manner and mapping the other one of the in phase components and the quadrature components to the plurality of subcarriers in a distributed manner.

* * * * *